United States Patent [19]

Needham et al.

[11] 3,876,613

[45] Apr. 8, 1975

[54] ROTATIONAL MOLDING AND COMPOSITIONS THEREFOR

[75] Inventors: Donald G. Needham; George R. Hill; Robert J. Martinovich, all of Bartlesville, Okla.

[73] Assignee: Phillips Petroleum Company, Bartlesville, Okla.

[22] Filed: Dec. 27, 1972

[21] Appl. No.: 318,968

[52] U.S. Cl. .................. 260/45.85 S; 260/94.9 GA
[51] Int. Cl. ............................................ C08f 45/38
[58] Field of Search ............... 260/94.9 GA, 45.85 S

[56] References Cited
UNITED STATES PATENTS 2,956,982  10/1960  McCall et al. ................... 260/45.85
3,214,422  10/1965  Mageli et al. ....................... 260/94.9
3,563,870  2/1971  Tung et al. .......................... 260/94.9

OTHER PUBLICATIONS

Crystalline Olefin Polymers – High Polymers Vol. XX, Pt. II, Raff et al. 1964 edition, pgs. 523 and 524.

*Primary Examiner*—V. P. Hoke

[57] ABSTRACT

Polymers of ethylene are rotationally molded and crosslinked to produce molded articles having high strength utilizing compositions including an ester of thiodipropionic acid in addition to the crosslinking agent.

12 Claims, No Drawings

ROTATIONAL MOLDING AND COMPOSITIONS THEREFOR

BACKGROUND OF THE INVENTION

This invention relates to rotational molding. In one aspect it relates to a composition of matter useful in rotational molding. In another aspect it relates to a method of rotational molding.

Rotational molding is accomplished by supplying to a mold a measured amount of powdered thermoplastic moldable material and rotating the mold while heating it to fuse the thermoplastic powder and then cooling the mold to cause the molded article to solidify. Usually the mold is closed and is rotated around more than one axis, for example two axes at right angles, to distribute the powdered material throughout the mold to produce a completely closed article.

It is highly desirable to produce by rotational molding articles which are suitable for severe service requirements. For example, it is desirable to produce articles having high impact strength. Preferably such articles also have high resistance to stress cracking. Polymers of ethylene, including homopolymers and copolymers of ethylene and olefin hydrocarbons having 3 to 8 carbon atoms per molecule including butene, and mixtures of such polymers, have many properties which make them attractive for the production of rotationally molded articles, if high impact strength and resistance to stress cracking can be achieved simultaneously with good molding of the article.

In order to obtain good molding characteristics to produce well formed rotationally molded articles it is necessary to use polymers of ethylene having high values of melt index, for example polymers having a melt index above about 5. It has been desirable to use high density polymers of ethylene in order to obtain the highest possible values for chemical resistance, rigidity and softening temperature. Polymers have been known having higher values of melt index but articles made from these polymers by rotational molding have been completely unsatisfactory since they had extremely low values of impact strength.

An object of the invention is to produce a composition useful for rotational molding to produce articles having well molded form and good physical properties. Another object of the invention is to produce rotationally molded articles having high impact strength at low temperature from polymers of ethylene. Preferably such articles also have high resistance to stress cracking.

As used in this application the following properties are measured according to the test described by the American Society of Testing Materials under the designation listed below and are in the units indicated:

Melt Index (M.I.) ASTM D-1238-62T, grams/10 min., Condition E.
High Load Melt Index (HLMI) ASTM D-1238-62T, Condition F, grams/10 min.
Density ASTM D-1505-63T, grams/cc.

Molecular weight distribution is indicated by the ratio of the weight average molecular weight, $M_w$, to the number-average molecular weight, $M_n$ ($M_w/M_n$). A high value for this ratio is indicative of a broad molecular weight distribution. Both weight-average and number-average molecular weight were determined by gel permeation chromatography (GPC), as described by J. C. Moore, J. Polymer Science, Part A, Vol. 2, pp. 835–843 (1964). Calibration of the GPC method was by membrane osmometry ($M_n$) and light scattering ($M_w$).

Impact strength is measured in foot pounds and is determined by a dart impact test. A flat sample 5 inches square and 0.125 inch thick is placed on a flat support having 3.5 inches diameter circular opening. A metal dart having a hemispherical contact point machined on a ½ inch radius (1 inch diameter) is dropped into the center of the sample from various heights until a height is reached at which the sample fails. The measured value is determined by multiplying the weight of the dart in pounds × the largest value of the height in feet from which the dart can be dropped without failure. For values of impact strength equal to or greater than 40 foot pounds a 10 pound dart is used. For lower values a 5 pound dart is used.

According to the invention hollow articles are produced by rotational molding of a polymer of ethylene, that is an ethylene homopolymer, a copolymer of ethylene and at least one acyclic straight or branched chain mono-1 olefin hydrocarbons having 3 to 8 carbon atoms per molecule, or a mixture thereof, having incorporated therein a selected crosslinking compound and a selected antioxidant. A preferred group of such hydrocarbons are the straight chain hydrocarbons, particularly those straight chain hydrocarbons having 3 to 6 carbon atoms per molecule. The copolymers are usually formed from 75 to 100 weight percent ethylene. Excellent results are obtained with such copolymers of ethylene and 1-butene.

Other polymers of ethylene include, for example, copolymers of ethylene and propylene, isobutene, 1-pentene, 3-methyl-1-butene, 1-hexene, 4-methyl-1-pentene, 1-heptene, 1-octene, and 4-ethyl-1-hexene.

Suitable crosslinking compounds are disclosed in U.S. Pat. No. 3,214,422 issued to Mageli et al. Oct. 26, 1965. These compounds are acetylenic diperoxy compounds and include hexynes having the formula

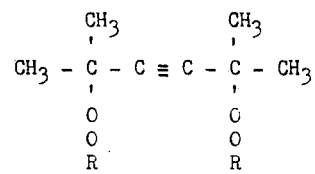

octynes having the formula

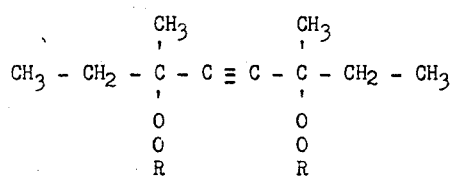

and octynes having the formula

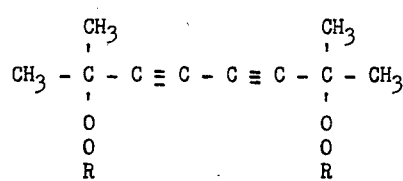

and where R is selected from the group consisting of tertiary alkyl, alkyl carbonate, and benzoate. In general, the molecular weights of the poly peroxides fall within the range of 230 to 550. Excellent results are achieved with the above-noted hexynes. Among the compounds encompassed within the above-noted hexynes, octynes and octadiynes are included:

2,7-Dimethyl-2,7-di(t-butylperoxy)octadiyne-3,5
2,7-Dimethyl-2,7-di(peroxy ethyl carbonate)octadiyne-3,5
3,6-Dimethyl-3,6-di(peroxy ethyl carbonate)octyne-4
3,6-Dimethyl-3,6-(t-butylperoxy)octyne-4
2,5-Dimethyl-2,5-di(peroxybenzoate)hexyne-3
2,5-Dimethyl-2,5-di(peroxy-n-propyl carbonate)hexyne-3
2,5-Dimethyl-2,5-di(peroxy isobutyl carbonate)hexyne-3
2,5-Dimethyl-2,5-di(peroxy ethyl carbonate)hexyne-3
2,5-Dimethyl-2,5-di(alpha-cumyl peroxy)hexyne-3
2,5-Dimethyl-2,5-di(peroxy beta-chloroethyl carbonate)hexyne-3
2,5-Dimethyl-2,5-di(t-butylperoxy)hexyne-3.

Preferably the polymers of ethylene used in the invention have a melt index of at least about 10, a density in the range of 0.920 – 0.970, preferably 0.940 – 0.970, and a molecular weight distribution not greater than about 7. Polymers having a melt index in the range of 10–200 give excellent results. Many useful products have a melt index in the range of 10–50. The polymers can be produced by any suitable method and can be selected from among those available commercially where desired. For example the polymers can be produced by the method of U.S. Pat. No. 2,825,721 of Hogan et al. issued Mar. 4, 1958. The desired melt index can be obtained by visbreaking if desired. By visbreaking is meant increasing the melt index by physical working which subjects the polymer to high shearing forces. This can be accomplished, for example, by subjecting the material to working at elevated temperature in an extruder. The extruder can have specially designed screws including one or more milling sections and/or a milling head.

To stabilize the molded article to avoid a change of properties upon extended exposure to heat it is preferred that an antioxidant be incorporated into the composition prior to molding. For normal temperature operation many stabilizing antioxidants can be used. However, we have found that many antioxidants have a negative effect upon low temperature impact strength. Good low temperature impact strength can be obtained by using esters of thiodipropionic acids of the formula

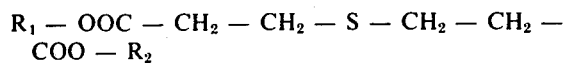

$$R_1 - OOC - CH_2 - CH_2 - S - CH_2 - CH_2 - COO - R_2$$

wherein $R_1$ and $R_2$ are selected from the group consisting of hydrogen and alkyl, alkenyl, aryl, and cycloalkyl hydrocarbon radicals and combinations thereof such as alkaryl, aralkyl and alkylcycloalkyl, having up to 22 carbon atoms and wherein at least one R has at least 10 carbon atoms per molecule.

Some suitable R radicals include for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, lauryl, stearyl, myristyl, oleyl, phenyl, xylyl, tolyl, ethylphenyl, naphthyl, cyclohexyl, benzyl, cyclopentyl, methylcyclohexyl, ethylcyclohexyl, and naphthenyl.

Some examples of suitable thiodipropionic acid esters include, for example, monolauryl thiodipropionic acid, butyl stearyl thiodipropionate, 2-ethylhexyl lauryl thiodipropionate, diisodecyl thiodipropionate, isodecyl phenyl thiodipropionate, benzyl lauryl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid.

A presently preferred group of esters of thiodipropionic acid in which both R radicals have 12–20 carbon atoms, more preferably esters in which both R groups are the same, including the dilauryl, distearyl, dimyristyl, dioleyl and diricinoleyl esters.

Preferably the amount of the ester is in the range of 0.02–0.1 weight percent based on the weight of the solid polymer. More often the amount is in the range of 0.03–0.06 weight percent which range includes amounts which have been found to give good results.

The products having high impact strength at low temperature can also be obtained when the antioxidant 2,6-di-t-butyl-4-methylphenol is incorporated into the polymer in addition to the ester of thiodipropionic acid of the present invention. Amounts of the 2,6-di-t-butyl-4-methylphenol up to about 1 percent by weight, preferably up to about 0.5 percent by weight can be utilized with good results.

EXAMPLE

Runs were made with a homopolymer of ethylene having a density of 0.965 and a melt index of 30, having incorporated therein 0.75 weight percent of the crosslinking agent 2,5-dimethyl-2,5-di(t-butylperoxy)hexyne-3 and various antioxidants. The crosslinking agent and the antioxidant were dry blended by tumble blending with pellets of the polymer and the resulting dry blend then repelletized. The pellets were ground to pass a 35 mesh sieve (U.S. Standard Sieve Series). In each run the article molded was a generally rectangular container 8 inches by 24 inches by 30 inches having a wall thickness of about 0.125 inch. Test panels 5 inches square were cut for the impact strength tests. In all runs the total amount of antioxidant was in the range of 0.04–0.05 weight percent.

The results of the run are presented in the Table below in which all values were obtained on samples obtained as described above. It will be seen that high values of impact strength at low temperature were obtained in those samples made with dilaurylthiodipropionate and with the combination of dilaurylthiodipropionate and 2,6-di-t-butyl-4-methylphenol but not with other antioxidants.

TABLE

| Cure Time, Min. | 11 | | | 12 | | | 13 | | | 14 | | | 15 | | |
| --- | --- | --- | --- | --- | --- | --- | --- | --- | --- | --- | --- | --- | --- | --- | --- |
| Antioxidant** | RT* | −20°F. | −80°F. | RT* | −20°F. | −80°F. | RT* | −20°F. | −80°F. | RT* | −20°F. | −80°F. | RT* | −20°F. | −80°F. |
| A | 60 | 50 | <5 | 50 | 50 | <5 | 60 | 45 | <5 | <70 | 30 | <5 | 65 | 25 | <5 |
| B | 45 | 45 | <5 | 50 | 45 | <5 | 50 | 40 | <5 | 55 | 35 | <5 | >70 | 40 | <5 |
| C | 60 | 20 | <5 | 50 | 60 | <5 | 50 | 45 | <5 | 65 | 65 | 20 | 65 | 60 | 25 |
| D | 55 | 50 | <5 | >70 | 55 | 10 | 70 | 55 | 10 | 70 | 45 | 45 | 70 | 45 | 40 |
| E | 65 | 55 | <5 | >70 | 55 | <5 | 70 | 55 | 60 | 70 | 55 | 65 | 60 | 50 | 65 |
| F | | | | | | | 55 | 70 | 40 | 55 | 70 | 65 | 50 | 55 | 65 |
| G | | | | | | | 50 | 25 | <5 | 50 | 40 | <5 | 55 | 60 | <5 |
| H | | | | | | | 50 | 15 | <5 | 50 | 35 | <5 | 55 | 60 | <5 |
| I | | | | | | | 55 | 20 | <5 | 55 | 60 | <5 | 60 | 65 | <5 |
| J | | | | | | | 50 | 15 | <5 | 55 | 15 | <5 | 60 | 45 | <5 |
| K | | | | | | | 55 | 20 | <5 | 60 | 20 | <5 | 60 | 60 | <5 |

*Room Temperature.
**A — No antioxidant.
B — Polymerized 1,2-dihydro-2,2,4-trimethyl quinoline, .05.
C — 4,4'-Thio-bis(2-t-butyl-5-methyl-phenol), .05.
D — Octadecyl [3-(3,5-di-t-butyl-4-hydroxy phenol)]propionate, .05.
E — 2,6-Di-t-butyl-4-methyl phenol, .02 & dilaurylthiodipropionate, .03.
F — Dilaurylthiodipropionate, .04.
G — Polymerized 1,2-dihydro-2,2,4-trimethyl quinoline, .04.
H — Di-beta-naphthol-p-phenyl diamine, .04.
I — 1,1,3-Tris-4(2-t-butyl-5-methyl phenol)butane, .04.
J — 1,3,5-Trimethyl-tris(3,5-di-t-butyl-4-hydroxy benzyl)benzene, .04.
K — n-Lauryl-p-amino phenol, .04.

It is preferred that the thiodipropionic acid ester be the sole antioxidant added after initial recovery of the polymer. Small residual amounts of other antioxidants can be present so long as any such amount present does not reduce low temperature impact strength.

As noted, however, small added amounts of 2,6-di-t-butyl-4-methylphenol do not appear to reduce the effectiveness of the dilaurylthiodipropionate.

Preferably both the crosslinking agent and the antioxidant are incorporated into the polymer rather than merely dry blended. For example blending of solids followed by repelletizing is effective.

Other ingredients which do not adversely affect either the rotational molding or the crosslinking and which do not impart undesirable characteristics to the finished article can be added. Examples of such materials which can be added under suitable conditions and in suitable amounts include pigments, stabilizers, antistatic agents, ultraviolet absorber for light stabilization, fillers, reinforcing materials, etc. However, one should make certain that any additive selected is compatible with the specific composition to permit good molding and crosslinking to obtain well formed articles having desired properties.

What is claimed is:

1. A composition of matter formed by incorporating into a solid polymer selected from the group consisting of ethylene homopolymers, copolymers of ethylene and at least one acyclic mono-1 olefin hydrocarbon having 3 to 8 carbon atoms per molecule, and mixtures thereof, having a melt index of at least about 10, a density in the range of 0.920 – 0.970, and a molecular weight distribution not greater than about 7, a. a crosslinking amount of an acetylenic diperoxy compound selected from the group consisting of hexynes having the formula

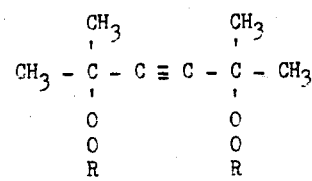

octynes having the formula

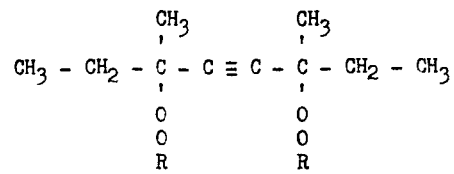

and octynes having the formula

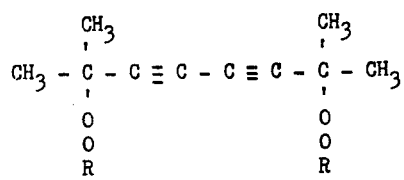

wherein R is selected from the group consisting of tertiary alkyl, alkyl carbonate, and benzoate; and b. between 0.02 and 0.1 weight percent based on the weight of solid polymer, of at least one ester of thiodipropionic acid of the formula

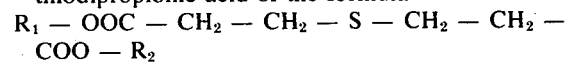

wherein $R_1$ and $R_2$ are selected from the group consisting of hydrogen and alkyl, alkenyl, aryl, cycloalkyl hydrocarbon radicals and combinations thereof having up to 22 carbon atoms, and wherein at least one R has at least 10 carbon atoms per molecule.

2. The composition of claim 1 wherein $R_1$ and $R_2$ are the same and have 12 to 20 carbon atoms per molecule.

3. The composition of claim 2 wherein $R_1$ and $R_2$ are selected from the group consisting of lauryl, stearyl, myristyl, oleyl and ricinoleyl.

4. The composition of claim 1 wherein the ester of thiodipropionic acid is dilaurylthiodipropionate, the amount of the ester is 0.03–0.06 weight percent, the acetylenic diperoxide compound is 2,5-dimethyl-2,5-di(t-butylperoxy)hexyne-3 and the amount of the acetylenic diperoxy compound is 0.1–10 weight percent.

5. A composition according to claim 4 wherein said solid polymer is an ethylene homopolymer having a density in the range of 0.940–0.970.

6. A composition according to claim 4 wherein said solid polymer is a copolymer of ethylene and 1-butene having a density in the range of 0.940–0.970.

7. A method for producing hollow articles which comprises rotationally molding a composition of matter formed by incorporating into a solid polymer selected from the group consisting of ethylene homopolymers, copolymers of ethylene and at least one acyclic mono-1 olefin hydrocarbon having 3 to 8 carbon atoms per molecule, and mixtures thereof, having a melt index of at least about 10, a density in the range of 0.920–0.970, and a molecular weight distribution not greater than about 7, a. a crosslinking amount of an acetylenic diperoxy compound selected from the group consisting of hexynes having the formula

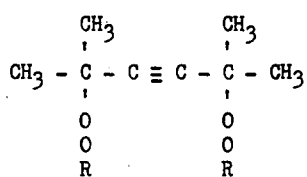

octynes having the formula

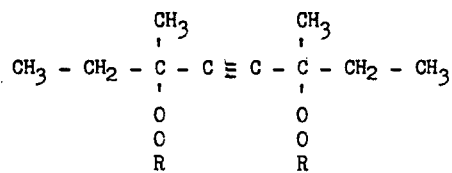

and ocytnes having the formula

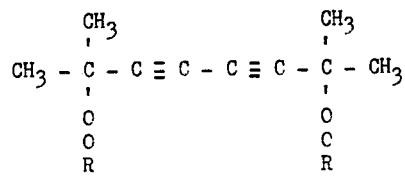

wherein R is selected from the group consisting of tertiary alkyl, alkyl carbonate, and benzoate; and b. between 0.02 and 0.1 weight percent based on the weight of solid polymer, of at least one ester of thiodipropionic acid of the formula

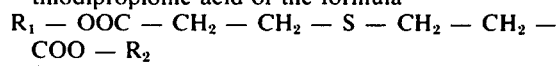

wherein $R_1$ and $R_2$ are selected from the group consisting of hydrogen and alkyl, alkenyl, aryl, cycloalkyl hydrocarbon radicals and combinations thereof having up to 22 carbon atoms, and wherein at least one R has at least 10 carbon atoms per molecule.

8. The method according to claim 7 wherein $R_1$ and $R_2$ are the same and have 12 to 20 carbon atoms per molecule.

9. The method according to claim 8 wherein $R_1$ and $R_2$ are selected from the group consisting of lauryl, stearyl, myristyl, oleyl and ricinoleyl.

10. The method according to claim 7 wherein the ester of thiodipropionic acid is dilaurylthiodipropionate, the amount of the ester is 0.03–0.06 weight percent, the acetylenic diperoxide compound is 2,5-dimethyl-2,5-di(t-butylperoxy)hexyne-3 and the amount of the acetylenic diperoxy compound is 0.1–10 weight percent.

11. The method according to claim 10 wherein said solid polymer is an ethylene homopolymer having a density in the range of 0.940–0.970.

12. The method according to claim 10 wherein said solid polymer is a copolymer of ethylene and 1-butene having a density in the range of 0.940–0.970.

* * * * *

Disclaimer

3,876,613.—*Donald G. Needham, George R. Hill*, and *Robert J. Martinovich*, Bartlesville, Okla. ROTATIONAL MOLDING AND COMPOSITIONS THEREFOR. Patent dated Apr. 8, 1975. Disclaimer filed Aug. 12, 1980, by the assignee, *Phillips Petroleum Company*.

Hereby enters this disclaimer to claims 1–12 of said patent.

[*Official Gazette September 30, 1980.*]